US005780124A

United States Patent [19]

Ripstein

[11] Patent Number: 5,780,124

[45] Date of Patent: Jul. 14, 1998

[54] ULTRAVIOLET ENHANCED OIL PAINTING AND METHOD THEREFOR

[76] Inventor: Jacqueline Ripstein, 2800 Williams Island Blvd. #804, Miami, Fla. 33160

[21] Appl. No.: 935,624

[22] Filed: Sep. 23, 1997

Related U.S. Application Data

[63] Continuation of Ser. No. 715,133, Sep. 17, 1996, abandoned.

[51] Int. Cl.$^6$ .................................. B44F 1/10; B32B 3/00

[52] U.S. Cl. ............................ 428/29; 428/195; 428/690; 428/913

[58] Field of Search ..................................... 427/258, 157, 427/265; 428/3, 29, 195, 690, 913.3

[56] References Cited

U.S. PATENT DOCUMENTS

| | | | |
|---|---|---|---|
| 267,284 | 11/1882 | Trotter, Jr. . | |
| 1,931,667 | 10/1933 | Loetscher | 427/268 |
| 2,430,232 | 11/1947 | Lynch | 40/134.1 |
| 2,654,971 | 10/1953 | Harrison | 428/913 |
| 3,068,010 | 12/1962 | Hagopian | 273/152.1 |
| 3,105,954 | 10/1963 | Gill, Jr. | 340/41 |
| 4,122,237 | 10/1978 | Kaiserman | 428/195 |
| 4,652,464 | 3/1987 | Ludlum et al. | 427/157 |
| 4,745,286 | 5/1988 | Jones | 250/459.1 |
| 5,018,232 | 5/1991 | Sachetti | 5/482 |
| 5,084,309 | 1/1992 | Smith et al. | 428/29 |
| 5,149,568 | 9/1992 | Becker | 428/14 |
| 5,172,937 | 12/1992 | Sachetti | 283/81 |

FOREIGN PATENT DOCUMENTS

| | | |
|---|---|---|
| 2582843 | 12/1986 | France . |

OTHER PUBLICATIONS

Photograph of a painting by Jacqueline Ripstein entitled Metamorphosis, dated 1988. The painting was made using an oil–on–oil technique as described in document A2 listed below, entitled "The Invisible Technique of Jacqueline Ripstein".

Document entitled "The Invisible Technique of Jacqueline Ripstein", 2 pages, undated. This document describes the philosophy and technique of oil–on–oil painting by Mrs. Ripstein. No date.

Hackh's Chemical Dictionary, Fourth Ed., McGraw Hill Book Co., p. 485, 1969.

Hawley's Condensed Chemical Dictionary, Richard Lewis Sr. 12$^{th}$ Ed. p. 713, 1993.

*Primary Examiner*—Michael Lusignan
*Assistant Examiner*—Fred J. Parker
*Attorney, Agent, or Firm*—Welsh & Katz, Ltd.

[57] ABSTRACT

An ultraviolet enhanced oil painting includes a plurality of sequentially disposed layers of oil based paints. At least one of the layers includes a transparent, ultraviolet enhanced, luminescent pigment mixed with the paint prior to layering. The ultraviolet enhanced paint layer produces a luminescent effect when subject to light. The painting exhibits one visible characteristic when subjected to ambient light conditions and exhibits at least one different visible characteristic when subjected to ultraviolet light. The ultraviolet enhanced paint layer can be disposed over the non-enhanced paint layer, the ultraviolet enhanced paint layer can be disposed between a backing media, such as a canvas and the non-enhanced paint layer, and the ultraviolet enhanced paint layer can be disposed between layers of the non-enhanced paint. A method of creating an ultraviolet enhanced oil painting includes sequentially disposing a plurality of layers of oil based paints onto a backing media such as a canvas. At least one of the layers includes a transparent, ultraviolet enhanced, luminescent pigment mixed with the paint prior to layering.

1 Claim, No Drawings

ULTRAVIOLET ENHANCED OIL PAINTING AND METHOD THEREFOR this application is a continuation of application Ser. No. 08/715,133 filed on Sep. 17, 1996, now abandoned.

FIELD OF THE INVENTION

This invention relates to ultraviolet enhanced oil paintings. More particularly, the invention relates to paintings created in multiple layers, having at least one ultraviolet enhanced paint layer.

BACKGROUND OF THE INVENTION

Artistic media, and particularly paintings, have evolved from the early caveman paintings found in various parts of the world, to become some of the most revered and defined works of art today.

In a general sense, paint is a viscous fluid which consists of a vehicle or binder, a pigment, a solvent or thinner and a dryer. Paint may applied as a fluid in thin coats or layers, and dries to a solid. The drying phenomena may be reversible. The change to a solid, i.e., the drying phenomena may occur by evaporation of the solvent, by chemical reaction or by a combination of both.

One type of paint, commonly known as oil based paint, uses an oil or oil based vehicle. Oil based points typically contain a dryer to accelerate drying the oil from the paint. Such paints dry by oxidation and solidify by crosslinking.

Water based paints use or water or a water soluble fluid as a vehicle. Early water based paints were water sensitive and thus had limited uses. Recent developments in water based paints have resulted in paints having greater water resistance. One type of water based paint is commonly referred to as acrylic water based paint. Acrylic water based paint includes a dispersion of acrylic polymers which are carried by the water base. After the paint is applied as a fluid, the water evaporates (and possibly further chemical change, e.g., oxidation or polymerization occurs), leaving a film coating.

Some of the modem forms of painting have, as their objective, the simulated movement of characters, environment, background and the like. Other modern forms of painting attempt to create the visual impression that the objects within the painting appear suddenly before a viewer's eyes.

One known method of achieving the desired simulated motion and sudden appearance effects, is by using different types of media such as different types of paint and the like. One type of mixing of media is the use of ordinary paint in combination with light emitting luminescent or phosphorescent paint, in, for example, a layered application.

It will be recognized and appreciated by those skilled in the art that oil based and water based acrylic paints have outstanding characteristics in that they provide a durable media, and offer a wide variety of colors, tones and textures. However, it has been observed that layering water based acrylic paint with oil based paint that has had ultraviolet activated pigments added to it can result in cracking due to the over coating or over-layering technique. Moreover, when layering water based acrylic paints, it has been observed that the layers tend to bleed into each other. The consequence of such bleeding is that the sharpness of the image can be lost, and thus the aesthetic value of the painting diminished. This is particularly true for paintings which include such luminescent or phosphorescent pigment additives.

Accordingly, there continues to be a need for a formulation of paints, which formulation permits the use of layers of oil based paints, where at least one of the paint layers includes a transparent, ultraviolet enhanced luminescent paint pigment.

SUMMARY OF THE INVENTION

An ultraviolet enhanced oil painting created from a plurality of sequentially disposed layers produces a luminescent effect when subject to light. The painting exhibits one visible characteristic when subjected to ambient light conditions and exhibits at least one different visible characteristic when subjected to ultraviolet light.

The painting consists essentially of a plurality of sequentially disposed layers of oil based paints. At least one of the layers includes a transparent, ultraviolet enhanced, luminescent pigment mixed with the paint prior to layering.

Advantageously, unlike known luminescent painting techniques, the present paint layering configuration permits the true painted images to be maintained in all of the paint layers, regardless of whether a prior paint layer has dried or hardened. Further, the present layering configuration eliminates the need for one or more intermediate coats of clear paint or varnish which could otherwise detract from the aesthetic qualities of the painting by blurring the painted images.

The enhanced or luminescent containing pigment layer can be disposed over the non-enhanced paint layer. Alternately, the ultraviolet enhanced paint layer can be disposed between a backing media, such as a canvas and the non-enhanced paint layer, or the ultraviolet enhanced paint layer can be disposed between layers of the non-enhanced paint.

It will be recognized by those skilled in the art that the present paint layering configuration is not limited to application on a canvas backing. Rather, any artist's media, such as cardboard, paper, wood and the like may be used. Lithographs and serigraphs may also be used as a backing media. Non-porous materials, such as plastics and fired ceramics may also be used as a base for the present paint layering configuration.

A method of creating an ultraviolet enhanced oil painting includes sequentially disposing or applying a plurality of layers of oil based paints onto a backing media, such as a canvas. At least one of the layers includes a transparent, ultraviolet enhanced, luminescent pigment mixed with the paint prior to layering.

The ultraviolet enhanced pigment paint layer can be applied over one or more of the non-luminescent containing pigment paint layers. Alternately, the ultraviolet enhanced pigment paint layer can be applied between the non-luminescent containing pigment paint layer and the canvas or other backing media. The ultraviolet enhanced pigment paint layer can also be applied between layers of the non-luminescent containing pigment paint.

Other features and advantages of the present invention will be apparent from the following detailed description and the appended claims.

DETAILED DESCRIPTION OF THE PREFERRED EMBODIMENTS

While the present invention is susceptible of embodiment in various forms, there is shown in the drawings and will hereinafter be described presently a preferred embodiments with the understanding that the present disclosure is to be considered an exemplification of the invention and is not intended to limit the invention to the specific embodiment illustrated.

The use of luminescence in painting and other works of art is well known. However, as provided above, due to the nature of many artistic materials, such as paints, inks and the like, cracking, peeling and fading have been observed when ultraviolet enhanced pigments are added to the materials. As is common in such artistic works, the paints, inks and the like are often applied to a backing material, such as a canvas, in layers. When the materials, and particularly a combination including ultraviolet enhanced paints, are applied to a canvas, it has been observed that the layers will tend to bleed into one another and detract from the overall aesthetic appeal of the artistic work. Such problems have been particularly observed when using water based acrylic artistic media.

In an attempt to overcome these problems, artists have applied layers of water based paint and/or varnish over a first or base layer of oil or water based paint. Second and subsequent layers of paint, some including luminescent pigments, are then applied over the clear paint or varnish to achieve the desired result. While this has met with some success, over time the paint layers over the clear paint or varnish tend to flake off and peel away, thus destroying the aesthetic value of the painting.

Unexpectedly, it has been found that layers of oil based paints, some of which layers include transparent, ultraviolet enhanced, luminescent pigments, can be applied directly on one another, to create a variety of desired optical effects. One such effect is that different visual characteristics within the painting can be observed under different light conditions. For example, in a painting, while one particular scene is visible in normal, i.e., ambient light conditions, other scenes or parts of the painting are observable only when the painting is subjected to ultraviolet light.

Moreover, it has also been observed that the layers can be applied on one another in a variety of ways. That is, the layer or layers which include the ultraviolet enhanced pigment can be applied as a first layer, closest to and directly on the canvas, with the non-enhanced layers applied thereover. Alternately, the ultraviolet enhanced layers can be applied last, farthest from the canvas, or interspersed between non-enhanced paint layers on the canvas.

There are numerous advantages to the present layering configuration over the known methods of creating ultraviolet enhanced artistic works. First, the true, painted images are maintained in all of the paint layers regardless of whether a prior paint layer has dried or hardened. Advantageously, it has been found that such a technique works well even if the prior paint layer has not fully dried or hardened. Moreover, the present layering configuration eliminates the need for one or more intermediate, clear layers of paint or varnish. Such intermediate layers tend to blur the visible images and detract from the aesthetic appeal of the work.

Direct layering application further creates a homogenous paint structure on the canvas. Such a homogenous structure reduces or eliminates the undesirable visual effects which may occur when media having different refractive indices is applied to the canvas. Thus, the visual and aesthetic appeal of the painting are further enhanced, and the artistic objective of the artist can be achieved.

The paint oil base can be natural or synthetic. Examples of suitable natural oils include linseed oil, soy oil, rape seed oil, castor oil and combinations thereof. The natural oils may include various non-plant oils, such as fish oils. Examples of suitable synthetic oils include those derived from di, tri and tetraols reacted with aromatic carboxylic acids having from 6 to 14 C atoms (other than the 2 C atoms in the two carboxylic acid groups), of aliphatic dicarboxylic acids having from 4 to 8 C atoms in the chain, or of cycloaliphatic dicarboxylic acids having from 6 to 12 C atoms (other than the two C atoms in the two carboxylic acid groups). Examples of such dicarboxylic acids to be included with terephthalic acid are phthalic acid, isophthalic acid, naphthalene-2,6-dicarboxylic acid, diphenyl-4,4'-dicarboxylic acid, adipic acid, sobacic acid, and cyclohexane diacetic acid, napthalene-1,2-dicarboxylic acid (and anhydride), naphthalene-2,3-dicarboxylic acid (and anhydride), succinic acid, maleic acid, maleic anhydride, fumaric acid, glutatic acid, and adipic acid.

Other suitable acids include naphthalene-1,X-dicarboxylic acid, wherein X=3 to 8; naphthalene-2,X-dicarboxylic acid, wherein X=4 to 8; diphenyl-2,X-dicarboxylic acid where X=2',3' or 4'; diphenyl-3,X-dicarboxylic acid where X=3' or 4'; and aliphatic and cycloaliphatic di and tri-carboxylic acids.

The paints may be further modified by the addition of viscosity modifying materials such as bentonite, fumed silica and the like; di and triols such as ethylene glycol, 2-2' oxydiethanol, glycerol and the like; and solvents and diluents such as common mineral spirits, naphtha, turpentine, paint thinner, benzene, toluene, o-xylene, m-xylene, p-xylene, mixtures of xylenes, methoxyethanol, ethoxyethanol, propoxyethanol, I-propoxyethanol, butyoxyethanol, 1-methoxypropanol, 2, 2-dimethoxypropanol, and the like.

In a current embodiment, the ultraviolet enhanced pigments include an 8-hydroxyquinoline aluminum complex, and organic based luminescent materials and optical brighteners. Most preferred, the ultraviolet enhanced pigments are formed from luminescent rare earth oxides, such as lanthanide oxides. The lanthanide oxides, exemplary of which are $PrO_2$, $Nd_2O_3$, $Sm_2O_3$, $Eu_2O_3$, $Ho_2O_3$, $Er_2O_3$, $Tm_2O_3$, will produce pigments which exhibit various luminescent properties when subjected to ultraviolet light. Such rare earth oxides are available from United Mineral & Chemical Corporation of Lyndhurst, N.J. and Nemoto & Co. Ltd., of Tokyo, Japan. Those skilled in the art will recognize that a wide variety of pigments of differing types can be used in the present invention.

In use, a base or backing material, such as a canvas, is prepared to receive the paint or other artist's media. It will be recognized by those skilled in the art that the backing media may include a wide variety of materials other than canvas, and including porous materials such as cardboard, paper, wood and the like. Lithographs, serigraphs, inkings and the like may be used as a backing material, as well as non-porous materials such as plastics, fired ceramics and the like. For purposes of the present application, reference to canvas or artist's canvas is intended to include all such backing media.

An oil based paint is then prepared by mixing the paint with a transparent, ultraviolet enhanced, luminescent pigment. The enhanced paint is then applied to the artist's canvas. A preparation of non-enhanced, oil based paint is also applied to the canvas. Advantageously, the enhanced and non-enhanced paints can be applied to the canvas in any order, and in a plurality of layers, without regard as to the placement of the enhanced paint. That is, the enhanced paint can be applied on the canvas, over the non-enhanced paint, in interspersed between layers of non-enhanced paint.

The enhanced and non-enhanced oil based paints can also be applied over each other before the prior layer of paint has fully dried or hardened. Unexpectedly, unlike layering of oil based and water based acrylic paint, even when the enhanced and non-enhanced oil based paints are applied over each other prior to fully drying or hardening, the paints do not run into one another, nor do the images become blurred or adversely effected.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A hand layering of oil based paints on a backing media for creating a painting, consisting essentially of two adjacent, hand applied touching layers consisting essentially of oil based paints wherein a first, upper layer includes only a transparent, ultraviolet, luminescent pigment that is not luminescent under only incandescent light, mixed with said oil based paint prior to layering, and wherein a second lower layer does not include said transparent, ultraviolet, luminescent pigment, and wherein said first upper layer is disposed by hand directly on and contacts a portion of said second lower layer, which second layer is disposed on the backing media for producing a luminescent effect of said first upper layer when subject to ultraviolet light, said first upper layer defining a first visible design and said second lower layer defining a second, different visible design, wherein the painting exhibits only said second different visible design when subjected to incandescent light and wherein the painting exhibits only said first visible design when subjected to ultraviolet light.

* * * * *